United States Patent [19]

Myles, Jr.

[11] Patent Number: 5,016,035
[45] Date of Patent: May 14, 1991

[54] ENCLOSED SELF-PORTRAIT PHOTOGRAPHIC STUDIO WITH CAMERA LOCATED BEHIND ONE-WAY MIRROR

[76] Inventor: Robert E. Myles, Jr., 55 Bartlett St., Malden, Mass. 02148

[21] Appl. No.: 397,915

[22] Filed: Aug. 28, 1989

[51] Int. Cl.⁵ .............................................. G03B 15/06
[52] U.S. Cl. .................................................... 354/290
[58] Field of Search ............................... 354/290, 291

[56] References Cited

U.S. PATENT DOCUMENTS

| | | | |
|---|---|---|---|
| 4,089,017 | 5/1978 | Buldini | 354/290 X |
| 4,771,305 | 9/1988 | Potoroka | 354/290 |
| 4,804,983 | 2/1989 | Thayer, Jr. | 354/290 X |

Primary Examiner—Brian W. Brown
Attorney, Agent, or Firm—Weingarten, Schurgin, Gagnebin & Hayes

[57] ABSTRACT

An enclosed integrated automatic photographic studio in which the subject may pose in complete privacy for portrait quality prints. A camera located behind a one-way mirror is activated by the subject. The studio is dimensioned and illuminated to produce portrait quality photographs using a single camera focus setting and shutter speed regardless of the subject's normal location in the studio.

8 Claims, 2 Drawing Sheets

ENCLOSED SELF-PORTRAIT PHOTOGRAPHIC STUDIO WITH CAMERA LOCATED BEHIND ONE-WAY MIRROR

FIELD AND BACKGROUND OF THE INVENTION

This invention relates to automatic photographic studios for producing portrait quality prints. Automatic coin-operated photographic self-portrait booths for snap-shot photography are known in the art. Typically, such booths include a doorway partially screened by a hanging curtain, a stool upon which the subject sits, a mirror, a camera, flash means, and camera activating means. Such booths take close-up snap-shots of the subject's head only. Such booths use direct positive paper photography. As a result, such booths do not take a photograph directly through the mirror. Instead, they take a photograph of the subject s reversed image on a second mirror, located behind the main mirror, thus making the final photograph right reading. As such booths use direct positive paper, no negative is produced and, therefore, no reproductions or enlargements can be made of the original photographs. In the present invention, no second mirror is required and a negative is produced. The photographs produced by such prior booths are approximately ¾×1¼ inches in size. Thus, such booths are predominantly used for identity photographs or spur-of-the-moment snapshots. Such booths do not produce portrait quality prints. Although such booths are activated by the subject, once the timer has been activated, the photographs are taken in quite rapid succession. The subject cannot purposely delay the process, for example, to change clothes. In any event, the user of such booths is unlikely to change clothes because such booths are typically located in areas with high pedestrian density and are not completely enclosed. The variety of poses which may be assumed inside such booths is extremely limited as the subject's head occupies virtually the entire photograph. In addition, it is not possible to select between portrait and landscape photography in such booths. Another disadvantage of such booths is that the intensity of the light inside the booth is not uniform, which causes some shadows to appear on the photographs. The non-uniformity of light is due partly to the booths entrance being only partially screened by the curtain which results in an uneven distribution of light within the booth.

It is also known in the art to locate a camera behind a one-way mirror for the purpose of secret observation for reasons of security or secrecy. However, as the object of cameras used for security and observation is merely identification, portrait quality photography is not required and is not obtained. In addition, because secrecy is desired, observation cameras are not used in conjunction with flash lighting.

SUMMARY OF THE INVENTION

The present invention provides a completely private environment in which a subject may pose for portrait quality Photography uninhibited by the presence of a photographer or the prying eyes of passers-by. The modular studio of the present invention is completely enclosed with access to studio area via a doorway housing an opaque door. A camera is located behind a single one-way mirror. The camera takes photographs through the one-way mirror directly, rather than off a second mirror located behind the one-way mirror. The subject is in front of the one-way mirror. The studio is dimensioned so that the camera shutter speed, film, and focus together with flash intensity will produce portrait quality photographs for all normal subject locations within the studio. Thus, no camera adjustments are required once the studio has been set up for the first time.

Once inside the studio, the subject can verify the correct pose and framing using the appropriately dimensioned one-way mirror. Means are provided for mounting a removeable standard sized background panel on the wall behind the subject. The subject activates the camera by pressing a switch when ready. Thus, the subject can take as much time as necessary to change poses, clothes, background and the like between photographs. In addition, because the present invention may use 35 mm film, an 24×36 mm. negative may be produced allowing enlargements of 20×30 inches or larger. In particular, 8×12 inch prints can be produced which can be cropped to the popular 8×10 inch portrait sized prints.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
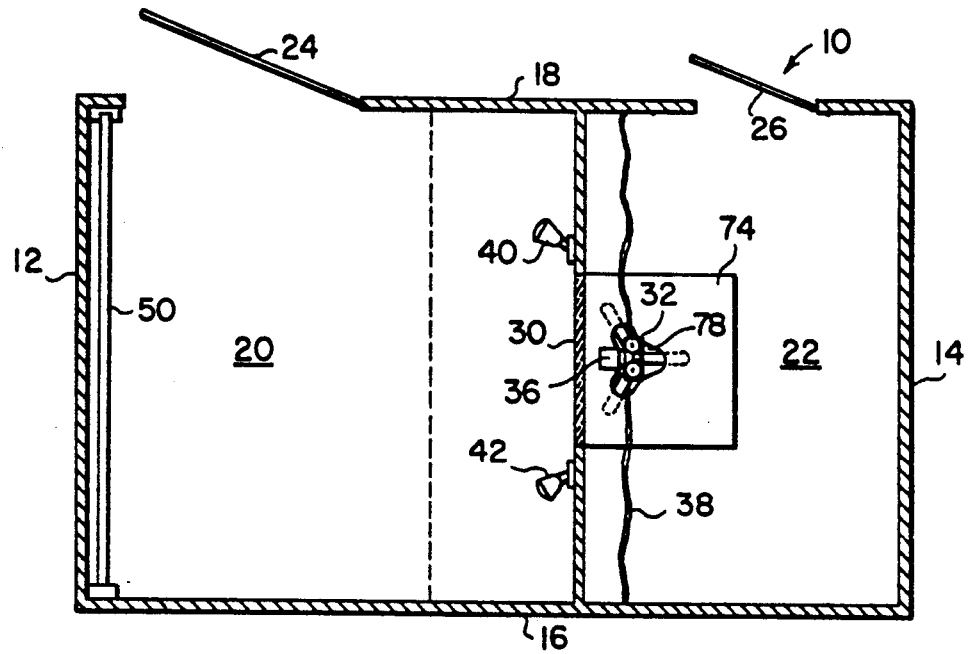
FIG. 1 is a top plan view of an embodiment of the present invention.

Referring to FIG. 1, an embodiment of the enclosed modular photographic studio 10 of the present invention is illustrated. In this embodiment, enclosed modular studio 10 is defined by end walls 12, 14, back wall 16 and front wall 18. The area enclosed by walls 12, 14, 16, 18 is covered by a ceiling (not shown). The interior of the enclosed modular studio 10 is divided into two areas; a studio area 10 and a camera room 22. A first door 24 provides access to the studio area 20. A second door 26 provides access to the camera room 22. A partition 28 separates the studio area 20 from the camera room 22. Partition 28 also acts as a mounting for one-way mirror 30 and master and slave strobe lights 40, 42, respectively. Walls 12, 14, 16, 18, doors 24, 26, partition 28 and ceiling (not shown) are all manufactured out of a light-weight opaque construction material, one example being panels of two sheets of masonite filled with insulating material, such as those manufactured by the O'Brien Partition Co. of Kansas City, Miss. One-way mirror 30 is dimensioned to reflect to the subject's image to allow the subject to observe the desired pose.

Figure 2:
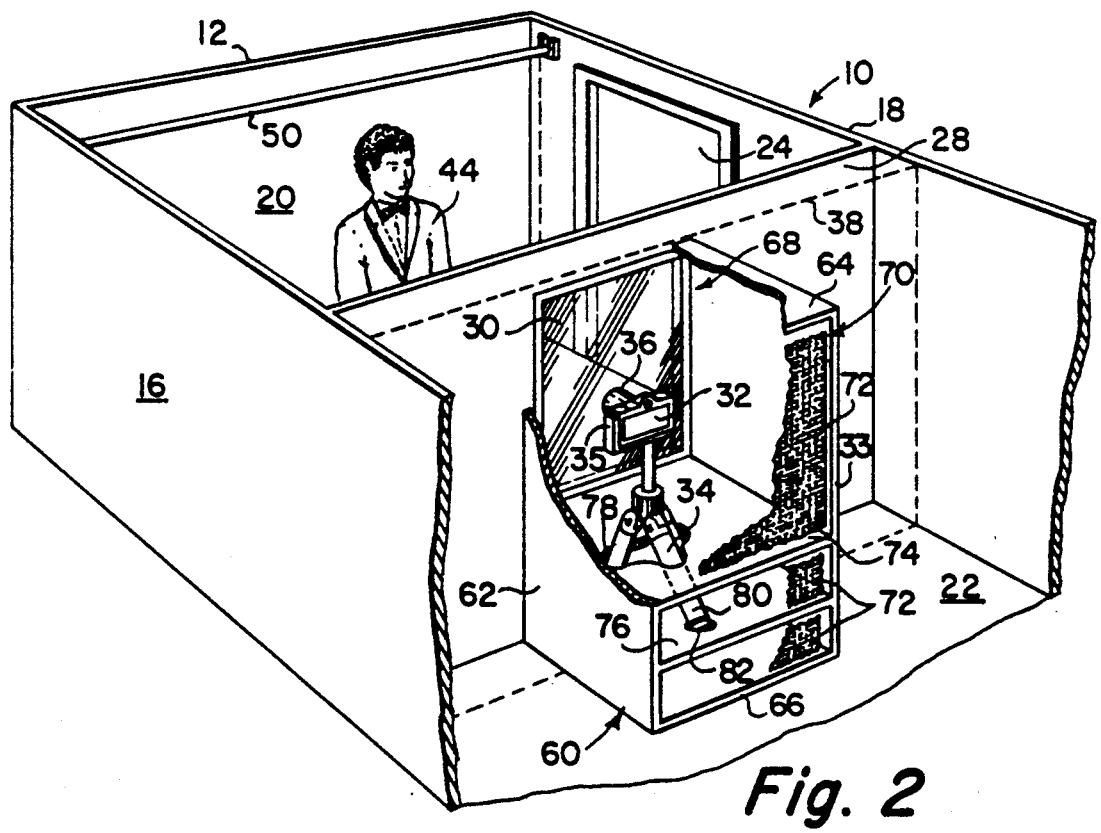
FIG. 2 is a perspective view of the camera means and second viewing surface of the present invention.

Referring now also to FIG. 2, a perspective view of the interior of camera room 22 is illustrated. One-way mirror 30 is mounted in partition 28. The second, i.e. viewing, surface of one-way mirror 30 faces camera room 22. Camera 32 is mounted upon tripod 34 and is disposed within camera room 22 with the lens 36 of camera 32 directed towards one-way mirror 30. Lens 36 protudes through light-absorbing drape 38, also illustrated in FIG. 1. Drape 38 absorbs light to minimize the reflection of light within camera room 22. Additionally, any white or bright lettering on the camera lens retainer (not shown) may be blackened using ink, polish or the like to further reduce reflections of light off one-way mirror 30 back into camera room 22.

The camera 32 and tripod 34 are preferably pre-assembled in a box assembly 60 having sides 62 and a toP and a bottom 64, 66. Box assembly 60 has a front aperture 68 and a rear aperture 70 which is covered by a black felt or cloth drape 72. The box assembly 60 includes an upper shelf 74 and a lower shelf 76. Upper shelf 74 has a three-lobed aperture 78 that accommodates the legs 80 of tripod 34 in a prescribed location to fix the position of camera 32. Lower shelf 76 has three recesses 82 that accommodate the respective ends of legs 80 further fixing the location of camera 32. Box assembly 60 is moveable allowing placement of front aperture 68 against mirror 30 for use and removal for servicing as necessary.

Figure 3:
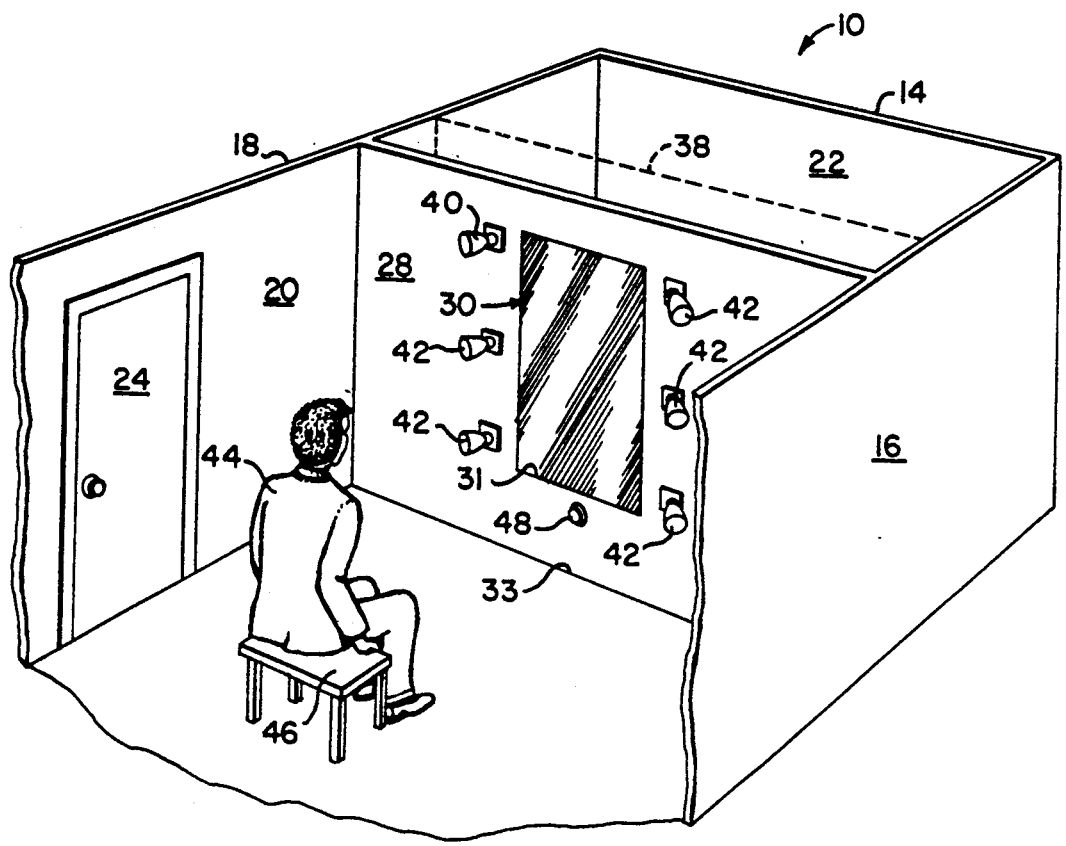
FIG. 3 is a perspective view of the interior of the studio of the present invention.

Referring now to FIG. 3, a perspective view of the interior of studio area 20 is illustrated. One-way mirror 30 is mounted in partition 28. The first, i.e. reflecting, surface of one-way mirror 30 faces studio area 20. Master strobe light 40 and slave strobe lights 42 are mounted upon partition 28. Master strobe 40 and slave strobe lights 42 are oriented to direct the light emitted therefrom to create a substantially uniform intensity of light within studio area 20 to minimize the shadows appearing on the final photographs. Subject 44 may be seated on a bench 46 as illustrated or may strike any other desired pose. Subject 44 activates camera 32 by manipulating switch 48. Switch 48 is connected to camera 32 as hereinafter described and may be an electrical door-bell type switch or any other appropriate switching means known to those having skill in the art.

Figure 4:
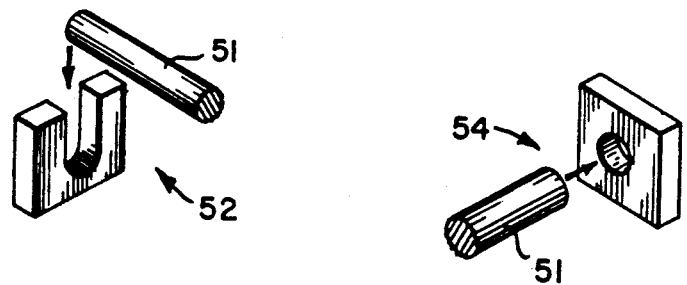
FIG. 4 illustrates the background panel mounting means of the present invention.

Referring now to FIG. 4, the background panel mounting means 52, 54 of the present invention are illustrated. In the portrait photography business it is often desirable to be able to change backgrounds quickly and easily. For example, the subject may wish to be photographed against a wood panelling background and a plain color background in the same session. As set forth below, in one embodiment of the present invention, the dimensions of end wall 12 are 48 inches width by 88 inches height. In the construction industry, a standard size of interior wall panelling is 48 inches by 96 inches. Use of such standard size panels trimmed to 86 inches width, therefore, greatly simplifies the process of changing backgrounds, particularly as such standard size panels will substantially cover end wall 12. Background panel 50, illustrated in FIG. 1, is attached to mounting bar 51 which is secured in place adjacent end wall 12 by first and second mounting means 52, 54, respectively. Mounting means 52, 54 are the clothes closet pole hangar retaining means illustrated or they may be other suitable mounting means known in the art.

In a preferred embodiment, the dimensions of studio area 20, midwall to midwall, are as follows: height is 88 inches; length of front wall 18 and back wall 16 is 72 inches; distance from end wall 12 to partition 28 is 48 inches; width of partition 28 and end wall 12 is 48 inches. The size of one-way mirror 30 is 20 inches width by 32 inches height. The lower edge 31 of one-way mirror 30 is located 28 inches from the lower edge 33 of partition 28 as illustrated in FIG. 3. The camera is a Canon T50 35 mm. camera. When a Canon T50 is used with a Canon 50 mm. 1.8 or 1.4 lens, and the studio area 20 has the above dimensions, the distance from the plane of the film to one-way mirror 30 should be approximately 18 inches. In this position, approximately the entire width of end wall 12 will be included in both partrait and landscape photography.

With camera means 32 in this position, the resulting photographs will be of high quality regardless of where the subject 44 is normally located in studio area 20, i.e. provided that the subject 44 is not within approximately 12 inches of partition 28 when the photograph is taken. This distance from partition 28 can be indicated with appropriate indicating means, such as painted marking on the walls of studio area 20, to warn the subject 44 that closer proximity to partition 28 will result in substandard quality photography. Camera 32 positioning can be adjusted according to the desired area to be photographed.

Referring now also to FIG. 2, the Canon T50 is mounted on a camera rotator 35 which, in turn, is mounted on a camera tripod 34. The camera rotator permits the camera to be rotated approximately about the axis of the camera lens without having to move tripod 34. The camera rotator may be an SW600 model manufactured by Steve Wilson & Co., 1808 Commercenter West, Suite F, San Bernadino, Calif. or other camera rotators known in the art. Thus, depending on the wishes of the subject, the operator can alternate between portrait and landscape photography while maintaining the central alignment. of camera 32 with end wall 12 and without repositioning the tripod.

The remote control of the Canon T50 is connected to switch 48 by conventional means. For example, switch 48 can be connected to the remote connector socket of the Canon T50. A PC connector is mounted on a hot-shoe adaptor which, in turn, is mounted on the camera hot shoe to override the camera's automatic setting and to set a flash synchronization of 1/60th of one second. In this configuration the wire which normally activates the camera's automatic mode, already overridden by the PC connector, is disconnected and activating switch 48 initiates the camera's built-in timer. Master strobe 40 is connected to the PC connector using synchronization cord or other suitable cable. The flash occurs, therefore, when the first shutter blade is open. In addition, the camera will not take a photograph until the auto-loaded film has advanced to frame counter number 1. This effectively limits the number of exposures on a twelve exposure roll to thirteen exposures. This is desirable in order to enable the operator of the studio to monitor accurately the total number of photographs taken in one or more sessions.

The master strobe light 40 is an AC Master Slave with PC cord rated at 25 Watts, 66 GN ISO 100 with 62 degrees of flash coverage manufactured by Morris Photos Industries, Ltd., Toyokame Bldg. #252, Yamashita-Cho, Naka-ku, Yokohama, Japan. Slave strobes 42 are AC Super Slaves rated at 30 Watts, 72 GN ISO 100 with 70 degrees of flash coverage and are also manufactured by Morris Photos Industries, Ltd.

One-way mirror 30 is an ASTM C 1036-85, Type I, Quality q3 glass with one side sputter-coated with various materials such as tin oxide, nickel chromium oxide, silver oxide and chromium oxide. "Mirrorvue" glass manufactured by Spectrum Glass Products, P.0. Box 408, East Railroad Street, Clinton, N.C. 28328 is appropriate. As stated above, the reflecting, surface of one-way mirror 30 faces the subject 44 in studio area 20.

Although referred to as a "one-way" mirror herein, it is to be understood that one-way mirror 30 may be sputter-coated glass such as "Mirrorvue" or any other glass or plastic sheet which has light reflection and transmission characteristics which reflect the subject's image but transmit sufficient light to permit the camera to take photographs which are of a commercially viable quality.

Prior to actual use of the present invention, the operator loads film into camera means 32, advances the film to the first frame and verifies that the camera is set for remote control. The operator also ensures that camera means 32 is correctly positioned with respect to end wall 12 so that the desired area of view is encompassed within the viewing angle of the lens of camera means 32. Upon exiting camera room 22, the operator ensures that no lights are left on therein.

To use the present invention, the subject 44 enters studio area 20 via first door 24. The subject closes first door 24 and is then allowed to rehearse poses in privacy, the operator having exited from camera room 22 via second door 26. Overhead lighting means (not shown) illuminate the studio area 20 when first door 24 is closed. The dimensions of one-way mirror 30 also permit the subject to frame a pose in one-way mirror 30 substantially similar to the manner in which the subject's pose will be framed in the final photograph. After rehearsing poses, subject 44 activates camera 32 by manipulating switch 48. Switch 48 activates the self-timer of camera 32 and subject 44 returns to strike the rehearsed pose. When a Canon T50 is used, the camera takes the photograph approximately ten seconds after the self-timer is activated. This process is repeated until the film is full or subject 44 elects not to continue. Other switching means are suitable for use with the present invention. For example, known infra-red or audio remote switching means, similar to those used with televisions and the like may be used but are more expensive than the door-bell type switching means described herein.

After the session has ended, the operator enters camera room 22 and removes the film from camera 32 for developing in conventional manner. The subject 44 collects the photographs after developing by the operator. Unlike with the typical fully automated booth which delivers only a small number of smaller photographs without negatives, a full film of portrait quality 8×12 inch proofs, which can produce 20×30 inch or larger photographs, can be produced using the present invention. Thus, for example, 8×12 inch photographs can be cropped to the popular 8×10 inch portraits. In addition, because a roll of negatives is produced, reproduction and enlargement are possible as desired at a later date. Alternatively, 35 mm. transparency film may be used with the present invention in order to produce film for slides.

The above described invention is illustrative of a novel photographic studio which overcomes significant disadvantages of prior photographic studios. Other modifications, embodiments and departures from the present disclosure are possible without departing from the inventive concept herein. The invention is not to be limited by what has been particularly shown and described except as indicated in the appended claims.

I claim:

1. An automatic photographic studio for producing negatives and portrait quality prints, comprising:
    a studio area;
    a camera room;
    an opaque partition disposed between said studio area and said camera room, said partition including a one-way mirror receiving orifice;
    a one-way mirror having opposite reflecting and viewing surfaces mounted in said one-way mirror receiving orifice, said reflecting surface facing said studio area and said viewing surface facing said camera room;
    a camera having a lens disposed in said camera room, said lens directed towards said viewing surface;
    camera rotating means connected to said camera for rotating said camera through 90 degrees about the longitudinal axis of said camera lens;
    flash lighting means mounted on said partition in said studio area nd connected to said camera, and;
    activating means disposed in said studio area and connected to said camera to simultaneously activate said camera to make an exposure of a portion of said studio area through said one-way mirror and to cause said flash lighting means to illuminate said studio area during said exposure.

2. The automatic photographic studio of claim 1 wherein said flash lighting means comprises:
    a master strobe light, and
    a plurality of slave strobe lights electrically connected to said master strobe light;
    wherein said master strobe light and said plurality of slave strobe lights are oriented to illuminate said studio area with light of substantially uniform intensity.

3. The automatic photographic studio of claim 1 wherein said camera includes a self-timer.

4. The automatic photographic studio of claim 1 further including a light-absorbing means disposed within said camera room for absorbing light to minimize the reflection of light within the camera room, said light-absorbing means having an aperture dimensioned to receive said camera lens.

5. The automatic photographic studio of claim 1 wherein said camera is a 35 mm type camera.

6. The automatic photographic studio of claim 1 wherein said camera includes an automatic film winder.

7. The automatic photographic studio of claim 1 further including mounting means upon which said camera is disposed.

8. The automatic photographic studio of claim 1 further including:
    a removeable background panel disposed within said studio area, and
    means for releaseably securing said removeable background panel within said studio area.

* * * * *

UNITED STATES PATENT AND TRADEMARK OFFICE
CERTIFICATE OF CORRECTION

PATENT NO. : 5,016,035

DATED : May 14, 1991

INVENTOR(S) : Robert E. Myles, Jr.

It is certified that error appears in the above-identified patent and that said Letters Patent is hereby corrected as shown below:

Col. 1, line 19, "take a photograph of the subject s"
should read --take a photograph of the subject's--.

Column 1, line 27, "booths are approximately 3/4 x 1 1/8"
should read --booths are approximately 3/4 x 1 3/8--.

Col. 1, line 46, "partly to the booths entrance" should
read --partly to the booths' entrance".

Column 1, line 61, "quality Photography uninhibited by"
should read --quality photography uninhibited by--.

Column 2, line 67, "protudes through light-absorbing"
should read --protrudes through light-absorbing--.

Column 3, line 8, "toP and a bottom 64, 66." should read
--top and a bottom 64, 66.--.

Column 6, line 23, "studio area nd connected to" should
read --studio area and connected to--.

Signed and Sealed this

Ninth Day of March, 1993

Attest:

STEPHEN G. KUNIN

Attesting Officer

Acting Commissioner of Patents and Trademarks